(12) United States Patent
Cofler et al.

(10) Patent No.: US 7,441,109 B2
(45) Date of Patent: Oct. 21, 2008

(54) COMPUTER SYSTEM WITH A DEBUG FACILITY FOR A PIPELINED PROCESSOR USING PREDICATED EXECUTION

(75) Inventors: Andrew Cofler, La Murette (FR);
Laurent Wojcieszak, Belfast (IE);
Isabelle Sename, Grenoble (FR)

(73) Assignee: STMicroelectronics Limited, Almondsbury, Bristol (GB)

( * ) Notice: Subject to any disclaimer, the term of this patent is extended or adjusted under 35 U.S.C. 154(b) by 0 days.

(21) Appl. No.: 11/384,024

(22) Filed: Mar. 17, 2006

(65) Prior Publication Data

US 2006/0184775 A1    Aug. 17, 2006

Related U.S. Application Data

(63) Continuation of application No. 11/192,307, filed on Jul. 28, 2005, now abandoned, which is a continuation of application No. 09/748,077, filed on Dec. 22, 2000, now abandoned.

(30) Foreign Application Priority Data

Dec. 23, 1999 (GB) ................... 9930587.2

(51) Int. Cl.
*G06F 7/38* (2006.01)
(52) U.S. Cl. ...................... 712/227; 717/134
(58) Field of Classification Search ................ 712/226, 712/227; 717/124–135
See application file for complete search history.

(56) References Cited

U.S. PATENT DOCUMENTS

| | | |
|---|---|---|
| 4,187,539 A | 2/1980 | Eaton |
| 5,404,496 A | 4/1995 | Burroughs et al. |
| 5,430,862 A | 7/1995 | Smith et al. |
| 5,442,757 A | 8/1995 | McFarland et al. |
| 5,544,311 A | 8/1996 | Harenberg et al. |
| 5,564,041 A | 10/1996 | Matsui et al. |
| 5,621,886 A | 4/1997 | Alpert et al. |

(Continued)

FOREIGN PATENT DOCUMENTS

EP    0 667 576    8/1995

(Continued)

OTHER PUBLICATIONS

Standard Search Report in connection with British application No. 9930587.2 corresponding to the instant application.

(Continued)

*Primary Examiner*—Tonia L. M. Dollinger
(74) *Attorney, Agent, or Firm*—Lisa K. Jorgenson; James H. Morris; Wolf, Greenfield & Sacks, P.C.

(57) ABSTRACT

A computer system with enhanced integrated debug facilities is described. According to one aspect, step-by-step execution of an instruction sequence is implemented where each instruction is guarded. If, after guard resolution, the instruction is committed, a divert routine is executed. If the instruction is not committed, the next instruction in the sequence is executed. According to another aspect, a stall state can be set at the decode unit either by reading stall attributes associated with debug instructions, or responsive to a stall command from an on-chip emulation unit.

10 Claims, 6 Drawing Sheets

U.S. PATENT DOCUMENTS

| | | | |
|---|---|---|---|
| 5,644,703 | A | 7/1997 | Kurakazu et al. |
| 5,715,440 | A | 2/1998 | Ohmura et al. |
| 5,717,909 | A | 2/1998 | Nemirovsky et al. |
| 5,748,936 | A | 5/1998 | Karp et al. |
| 5,752,013 | A | 5/1998 | Christensen et al. |
| 5,828,824 | A | 10/1998 | Swoboda |
| 5,857,094 | A | 1/1999 | Nemirovsky |
| 6,754,856 | B2 | 6/2004 | Cofler et al. |
| 6,832,334 | B2 | 12/2004 | Wojcieszak et al. |
| 7,013,256 | B2 | 3/2006 | Cofler et al. |

FOREIGN PATENT DOCUMENTS

| | | |
|---|---|---|
| EP | 0 720 092 | 12/1995 |
| EP | 0 869 434 | 10/1998 |
| EP | 0 943 995 | 9/1999 |

OTHER PUBLICATIONS

Standard Search Report in connection with British application No. 9930586.4, counterpart of U.S. Appl. No. 09/748,785.

Standard Search Report in connection with British application No. 9930588.0, counterpart of U.S. Appl. No. 09/748,762.

Standard Search Report in connection with British application No. 9930590.6, counterpart of U.S. Appl. No. 09/748,763.

Standard Search Report in connection with British application No. 9930589.8, counterpart of U.S. Appl. No. 10/021,269.

Standard Search Report in connection with British application No. 9930587.2 corresponding to the instant application, filed Dec. 23, 1999, search date Dec. 11, 2001.

Standard Search Report in connection with British application No. 9930586.4, counterpart of U.S. Appl. No. 09/748,785, filed Dec. 23, 1999, search date Nov. 28, 2001.

Standard Search Report in connection with British application No. 9930588.0, counterpart of U.S. Appl. No. 09/748,762, filed Dec. 23, 1999, search date Sep. 19, 2001.

Standard Search Report in connection with British application No. 9930590.6, counterpart of U.S. Appl. No. 09/748,763, filed Dec. 23, 1999, search date Sep. 19, 2001.

Standard Search Report in connection with British application No. 9930589.8, counterpart of U.S. Appl. No. 10/021,269, filed Dec. 23, 1999, search date Sep. 19, 2001.

COMPUTER SYSTEM WITH A DEBUG FACILITY FOR A PIPELINED PROCESSOR USING PREDICATED EXECUTION

RELATED APPLICATIONS

This application is a continuation of application Ser. No. 11/192,307, filed on Jul. 28, 2005 which is a continuation of application Ser. No. 09/748,077, filed Dec. 22, 2000, entitled "Computer System With Debug Facility," which applications are herein incorporated by reference in their entirety.

FIELD OF THE INVENTION

The present invention relates to a computer system with localised on-chip debug facility.

BACKGROUND OF THE INVENTION

With the advent of more highly embedded, high performance processors it is becoming increasingly important to improve debug facilities to allow these processors to be properly debugged, preferably in real time and in a non-intrusive fashion.

A single chip integrated circuit can now integrate, on the same chip, a processor and a debug or emulation unit. The emulation unit can be connected to an on-chip link which allows off-chip communication to a similar off-chip link, and thus to a debug host. This allows the on-chip emulation unit to behave autonomously in relation to certain observed conditions of the processor, or to be controlled from the debug host to allow a user to take over debugging when necessary.

It is important for an on-chip emulation unit to operate with very low intrusion levels, particularly for debugging real time applications. Moreover, it is advantageous if high priority interrupts can be serviced at full speed, that is ahead of debugging routines that might be running.

A particular problem arises in debugging processors which rely on predicated execution. According to the principle of predicated execution, instructions to be executed are each guarded against a particular one of a set of guards. The instruction is finally executed or not depending on resolution of the guard, that is determination of the value of the guard as true or false.

Normally, if the guard is resolved as true, the instruction is said to be committed and is executed. If the guard value is resolved as false, the instruction is not executed and has no effect on the architectural state of the machine. It is possible to have so-called falsely guarded instructions which are committed if the guard is false, and not executed if the guard is true. In a pipelined machine, the guard may not be resolved until a number of pipelined cycles later than the instruction has been fetched from memory. Thus, debugging schemes which take over the machine when a particular instruction address has been detected at the fetch stage may do so unnecessarily in a situation where the guard value would later have been resolved as false. In fact, after some predicated execution code, the debug mechanism could, operating like this, cause the machine effectively to be locked in a permanent stall cycle until a user intervened.

Aspects of the present invention discussed herein provide improved debug facilities for pipelined machines.

SUMMARY OF THE INVENTION

According to one aspect of the present invention, a step-by-step function is provided which takes into account predicated execution. Thus, according to one aspect of the present invention there is provided a computer system for executing predicated instructions wherein each instruction includes a guard, the value of which determines whether or not that instruction is executed, the computer system comprising: a fetch unit for fetching instructions to be executed; a decode unit for decoding said instructions; at least one pipelined execution unit for executing decoded instructions and being associated with a guard register file holding values of the guards to allow resolution of the guards to be made to determine whether an instruction is committed; and an emulation unit including control circuitry which cooperates with the decode unit to selectively control the decode unit to implement step-by-step execution of an instruction sequence wherein, for each committed instruction, a divert routine is executed by the computer system and for each non-committed instruction the next instruction in the instruction sequence is executed.

Another aspect of this invention provides a method of executing predicated instructions wherein each instruction includes a guard, the value of which determines whether or not that instruction is executed, the method comprising: fetching each of a sequence of instructions to be executed; decoding each instruction and requesting resolution of its guard to determine whether the instruction is committed; and if the instruction is committed, implementing a divert routine whereby debug code is executed and, if the instruction is not committed, fetching and decoding the next instruction in the instruction sequence.

A second aspect of the present invention provides stall functionality at the decode unit. Thus, a further aspect of the invention provides a computer system for executing instructions in a first, user mode and a second, debug mode, the computer system comprising: a first store for holding user instructions; a second store for holding debug instructions, wherein the debug instructions are held in the second store in association with debug attributes, wherein said debug attributes include a stall attribute; a fetch unit for selectively fetching instructions from the first or second store depending on the mode of the computer system; a decode unit for decoding said instructions and reading said attributes; and a emulation unit which includes control circuitry which cooperates with the decode unit to selectively set the decode unit into a stall state by issuance of a stall signal; wherein the decode unit includes stall control circuitry which is responsive to reading of a stall attribute or receipt of a stall signal from the emulation unit to place the decode unit into a stall state.

A further aspect of this invention provides a method of setting a stall state of a computer system which comprises a fetch unit for fetching instructions to be executed and a decode unit for decoding said instructions, wherein the stall state is set selectively at the decode unit by reading stall attributes associated with debug instructions in a debug mode, or by receipt of a stall command responsive to certain conditions when executing user instructions in a user mode.

For a better understanding of the present invention and to show how the same may be carried into effect, reference will now be made by way of example to the accompanying drawings.

DESCRIPTION OF THE PREFERRED EMBODIMENT

Figure 1:
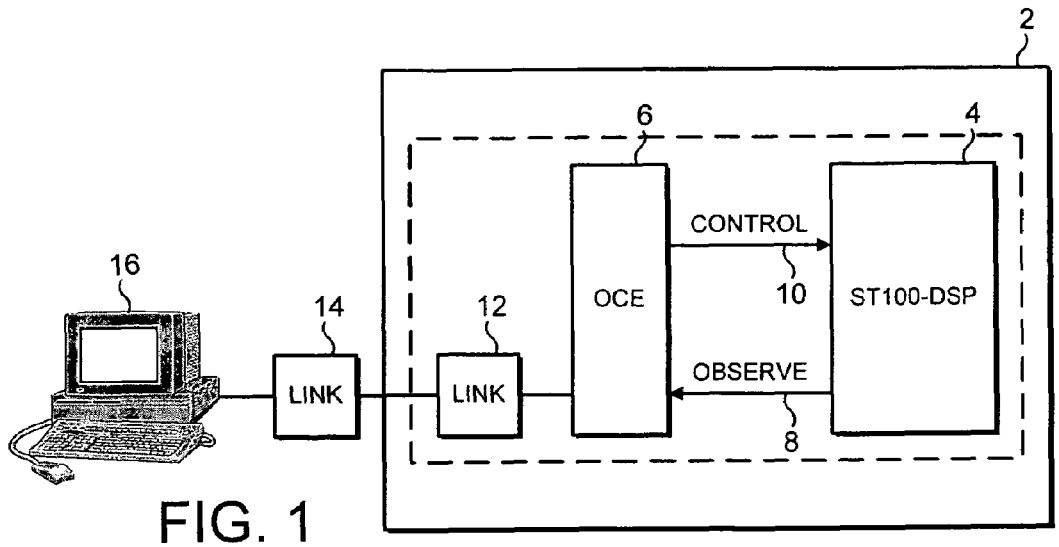
FIG. 1 is a schematic diagram showing the context of the invention.

FIG. 1 is a diagram illustrating the context of the invention. Reference numeral 2 denotes a single chip integrated circuit on which is provided a processor 4 which has a high level of functionality. One of the difficulties which exists with high performance, highly embedded processors is that they can be difficult to debug. Thus, an on-chip emulation (OCE) block 6 is provided on-chip which receives information from the processor along an observe path 8 and provides control when necessary along a control path 10. An on-chip link 12 is connected to the OCE block 6 and provides an off-chip communication path to an off-chip link 14 which is connected to a debugger host 16 which acts to control the on-chip emulator 6. The on-chip emulator 6 can operate autonomously, implementing certain control routines in response to certain observed conditions. As will be described later, the on-chip emulation block includes an on-chip emulation program memory 50 (FIG. 2) which holds debugging code ready for execution by the processor 4 when the OCE block 6 has control of the processor 4. The OCE block 6 also allows control of the processors to be taken over by the off-chip debugger host 16 via the links 12,14. In particular, this allows the mode of the on-chip emulator 6 to be controlled by the host. It allows debug code to be loaded into the emulation program memory from the host 16.

Figure 2:
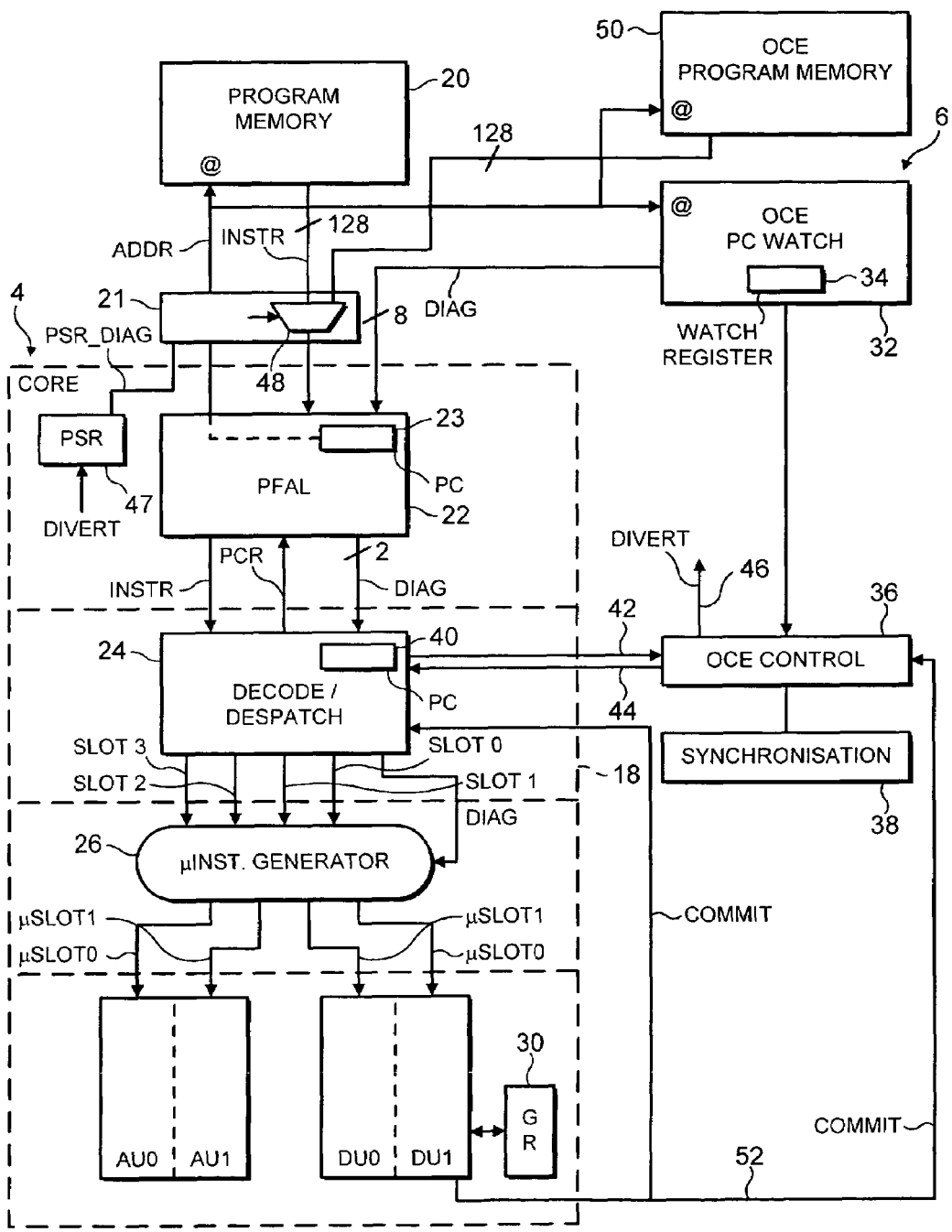
FIG. 2 is a block diagram of a computer system with an emulation unit.

FIG. 2 is a more detailed schematic of the processor 4 in combination with selected on-chip emulation functional blocks which form part of the on-chip emulator 6. The processor 4 comprises a processor core 18 which is connected to a program memory 20 which holds code to be executed by the core. The core comprises a prefetch/align stage 22, a decode/dispatch stage 24, a microinstruction generator 26 and four parallel execution pipelines $AU_0, AU_1, DU_0$ and $DU_1$. The core 4 operates in a pipelined manner such that all stages can be active at the same time, on different instructions. The pipeline stages are denoted by horizontal dotted lines in FIG. 2. It will readily be understood that each execution pipeline itself $AU_0, AU_1, DU_{0-}, DU_1$ constitutes a number of pipeline stages.

A brief description will now be given of operation of the core 18 sufficient to understand the functionality of the on-chip emulator which will be described later. Other details about the core are not discussed herein.

Figure 3:
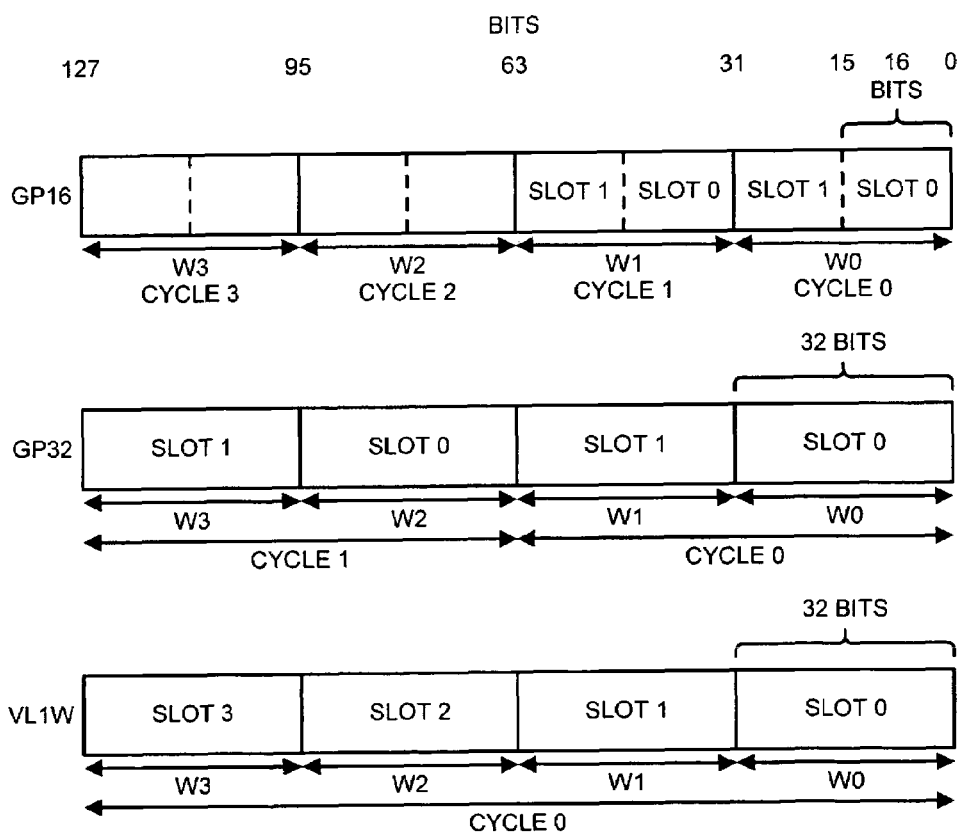
FIG. 3 is a sketch illustrating three different instruction modes of the processor.

The program memory 20 contains code in the form of 128 bit long words. Each word contains a plurality of instructions depending on the instruction mode of the processor. In this respect, reference is made to FIG. 3.

According to a first instruction mode, a pair of 16 bit instructions are supplied during each machine cycle to the decoder 24 from the prefetch/align stage buffer 22. this pair is denoted slot0, slot1 in bit sequences w0,w1 etc. This is referred to herein as GP16 superscalar mode.

According to a second instruction mode, two instructions each having a length of 32 bits are supplied to the decoder 24 from the prefetch/align stage 24 in each machine cycle, for example w0,w1 in CYCLE 0. This mode is referred to herein as GP32 superscalar mode.

According to a third instruction mode, four instructions w0,w1,w2,w3 each of 32 bits in length are supplied to the decoder in each machine cycle. This is referred to herein as VLIW mode.

In all modes, each fetch operation initiated to the program memory 2 retrieves an instruction word of 128 bits in length. Thus, in GP16 mode, the instruction word comprises eight 16 bit instructions, paired as slot0,slot1 for each machine cycle. In GP32 and VLIW mode, the instruction word comprises four 32 bit instructions.

The prefetch/align stage 22 includes a fetch program counter 28 which is responsible for issuing addresses to fetch instruction words from the program memory 20. Instructions are supplied to the decode/dispatch stage 24 depending on the instruction mode of the processor. That is, two GP32 instructions or two GP16 instructions are supplied in each cycle of operation. In VLIW mode, the four VLIW sub-instructions are supplied simultaneously to the decode/dispatch stage 24. The decode/dispatch stage 24 issues an acknowledge signal ACK to say that it has accepted the instructions to be decoded. It is an important feature of this machine that, once the decode/dispatch stage 24 has accepted its instructions and issued an acknowledgement signal ACK, these instructions will proceed to the remaining stages of the pipelined core. An instruction cannot be "killed" after the decode/dispatch stage 24, although of course they may not be executed if the guard is false. The instruction fetches are speculative since fetched instructions may never be executed by the core.

The decode/dispatch stage 24 supplies instructions to the microinstruction generator 26. The microinstruction generator generates microinstructions for the individual execution pipelines depending on the nature of the machine instructions. The execution pipelines $AU_0, AU_1$ are address unit pipelines which deal with memory access instructions including loads and stores. The execution pipelines $DU_0, DU_1$ are data unit pipelines which deal with data processing instructions including arithmetical and logical calculations.

The processor operates on the basis of predicated execution. That is, each instruction in the program memory 20 is guarded on a guard selected from $G_0$ to $G_{15}$. $G_{15}$ always has a value of one, that is that instruction will always be executed. The values of the guards are held in an architectural guard register file 30. The guard register file 30 is associated with the data unit pipelines $DU_0, DU_1$ because this is where most of the guard resolution takes place. Special instructions allow guard values to be transmitted to and from the address unit pipelines $AU_0, AU_1$ which can, in fact, maintain its own guard register file. For the purposes of the functionality of the on-chip emulator 6, the guard register file 30 associated with the data unit pipeline is the only guard register file of interest, because this is the master guard register file which is maintained up to date architecturally. Thus, this one is used to supply guard values to the OCE. Until the guard on an instruction has been resolved, it is not possible to know whether or not the instruction is committed, that is it has been executed such as to change the architectural state of the machine. For debugging purposes, it is important to know whether an instruction is committed or not. However, this cannot be determined at the decode/dispatch stage 24 because at that stage there has been no resolution of the guard of the instruction. Recall also that there is no mechanism for "killing" instructions after they have been acknowledged by the decode/dispatch stage.

Figure 4:
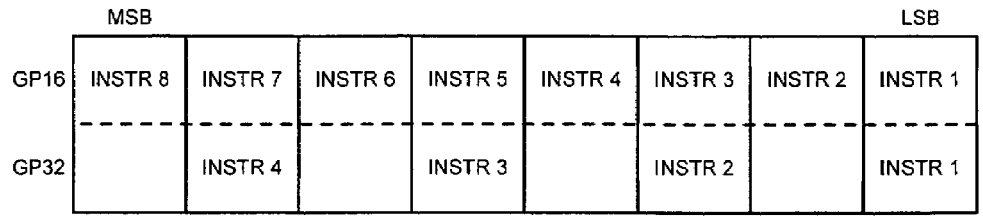
FIG. 4 is a diagram illustrating how the diagnostic flags are set.

The OCE block 6 comprises a PC watch block 32 which snoops addresses issued by the prefetch align stage 22 to the program memory 20. Addresses which it is programmed to match are held in a watch register 34. When the PC watch block 32 sees an address which it has been programmed to watch for so-called diagnostic flags diag are added to the instruction word before it is supplied to the prefetch/align stage 22. There are eight possible such diagnostic flags. The diagnostic flags are set according to the different instruction modes. If a diagnostic flag is set this denotes that a particular instruction is a PC (program count) watch, i.e. an instruction of interest to the emulator 6. FIG. 4 illustrates how the diagnostic flags are set in GP16 and GP32 modes. There are eight diagnostic flags because there can be up to eight GP16 instructions in a 128 bit fetch line. The PC watch unit has an exact address of each PC it is looking for and sets the corresponding flag according to the positions illustrated in FIG. 4. In GP16 mode, each flag can be set. In GP32 mode, diagnostic flags can be set on bits 0,2,4 and 6 denoting each GP32 instruction respectively. In VLIW mode, four GP32 diagnostic flags (bits 0,2,4 and 6) can be set.

The prefetch align stage 22 sends to the decode/dispatch stage 24 a 2-bit DIAG flag which denotes which, if any, of the instructions supplied to the decode/dispatch stage 24 are a PC watch. In VLIW mode, all bits are set in the four-bit DIAG flag to denote that the VLIW instruction is a PC watch.

In our co-pending U.S. application Ser. No. 09/748,785 claiming priority from GB Application No. 9930586.4 two watch modes are described, precise and non-precise. Only the precise watch mechanism is described herein because this forms the basis of the stall and step-by-step functions of the processor. Precise watching is firstly explained with reference to PC watches, although it will be appreciated that the same principles can be used with software breakpoints. That is, special instructions can be included in the code executed by the processor with dedicated opcodes to cause a breakpoint. Such instructions have the same effect in the following as instructions which have been tagged as PC watch instructions. Moreover, the precise watch mechanism can be triggered by a step-by-step control register in the emulator 6 as discussed later. According to a precise PC watch, no subsequent instructions are allowed to enter the execution pipeline, that is beyond the decode/dispatch stage 24. The state of the registers and memory is consistent with the state just before the breakpoint (because the watched instruction has not been executed and has therefore not affected the architectural state of the machine at the point at which the watch is detected). Because the processor is based on predicated execution, it is necessary to hold up the instruction at the decode stage 24 while the guard is resolved as committed or not.

In order to implement precise and non-precise PC watching, the on-chip emulator 6 has an OCE control unit 36 and a synchronisation unit 38 for synchronising the program count of instructions under watch with commit values supplied by the data unit. The decode/dispatch stage 24 has its own program counter 40 which holds the PC values of instructions currently being decoded. The decode/dispatch unit 24 supplies the PC of each instruction which it receives, together with a flag identifying PC watch instructions, to the OCE control unit 36 along line 42. The PC values are held in a PC FIFO in the synchronisation unit 38. Commit values from the data unit are held in a commit FIFO in the synchronisation unit, and the OCE only validates the PC watch once it sees that the instruction at that PC was committed. The action of the emulator 6 while awaiting guard resolution depends on whether it is in precise or non-precise watch mode. A signal is returned to the decode/dispatch unit 24 on line 44 indicating the status of the watch. The OCE control block 36 can also set the processor into a debug mode. To achieve this, an architectural bit PSR.DIAG is set inside the program status register 47. This bit is sent with the fetch address to a program memory controller 21. If clear, the fetch is made from the normal program memory. This bit controls a multiplexor 48 in the program memory controller. The on-chip emulator 6 has its own program memory 50 which holds debug code which is executed by the processor core 18 when in debug mode. When the PSR.DIAG bit is set, the fetch is made from the OCE program memory 50 instead of from the normal program memory 20. Thus, fetched debug instructions are executed by the processor as normal instructions.

Figure 5:
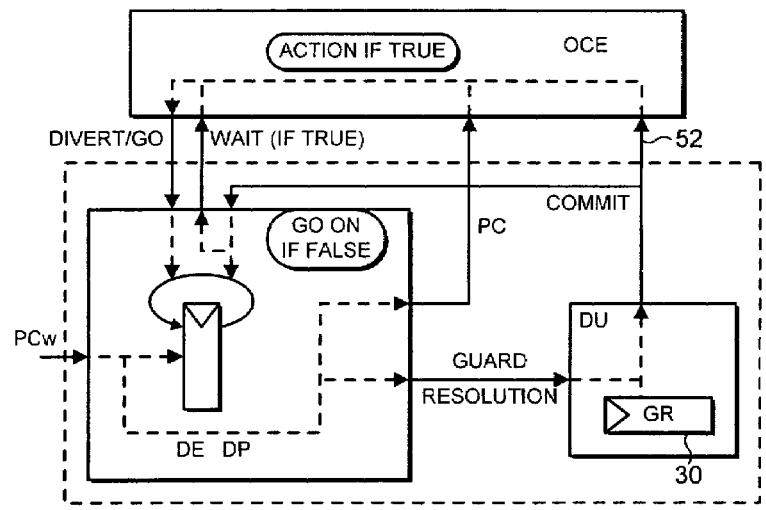
FIG. 5 is a diagram illustrating precise PC watching.

A precise PC watch will now be described with reference to FIG. 5. The software breakpoint or PC watch instruction is detected at the decode/dispatch stage 24 by decoding the opcode or diagnostic flags respectively. A PC value is sent to the OCE control block 36 which returns a signal to the decode/dispatch stage 24 along line 44, and the decode/dispatch stage 24 therefore does not issue a normal acknowledgement instruction. Instead, the decoder issues an instruction to the data unit pipelines $DU_0, DU_1$ to request the values of the guards on which the watched instructions are guarded. The decode/dispatch stage 24 enters a waiting state (stall) in which it will acknowledge no further instructions (other than high level interrupts discussed later). When the value of the guard has been resolved in the data unit execution pipelines $DU_0, DU_1$ from the guard register file 30, a Commit signal 52 is sent both to the on-chip emulator 6 and to the decode/dispatch stage 24. If the value has been resolved such that the instruction is committed the value is "1". If the instruction is not committed the value is "0". On receiving a Commit value "1", the decode/dispatch stage 24 waits for a command from the emulator 6 to proceed. The command can be a divert command or a go command. If the command is divert, the PSR.DIAG bit is set so that debug code is fetched from the OCE program memory 50 and the next instructions therefore flush out the existing instructions which were in the prefetch/align stage 22 prior to the instruction which set the PC watch. If the command is "go", the processor is allowed to continue executing the code at which the PC watch was set. It is quite possible to set up a situation such that the emulator 6 issues a go command for the first and second times of a watch instruction being detected, and divert the third time for example.

Figure 6:
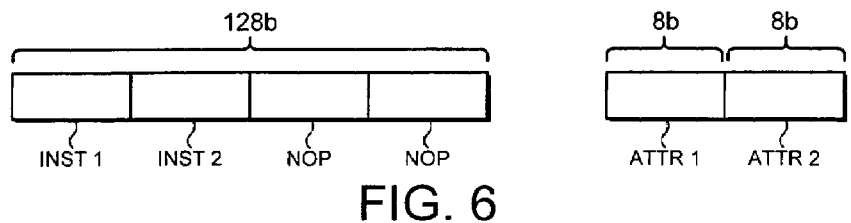
FIG. 6 illustrates a layout of debug code.

Before describing the step-by-step mode of the processor, the organisation of debug code in the OCE program memory will first be mentioned with reference to FIG. 6. Debug code is in GP32 mode. That is, two 32 bit instructions are decoded and executed in each machine cycle. As already described, each instruction fetch fetches 128 bits from memory. In each 128 bit fetch sequence there are two GP32 instructions INST1,INST2 and two no-ops. In addition, the on-chip emulation program memory 50 holds with each instruction an 8 bit attribute ATTR1,ATTR2. The attributes are fetched and decoded in the same manner as the diagnostic flags. In particular, the attributes affect how the instructions are treated and in particular allow such operations as stall and atomic to be set on particular instructions. The attribute functions are decoded at the decode stage.

Figure 7:
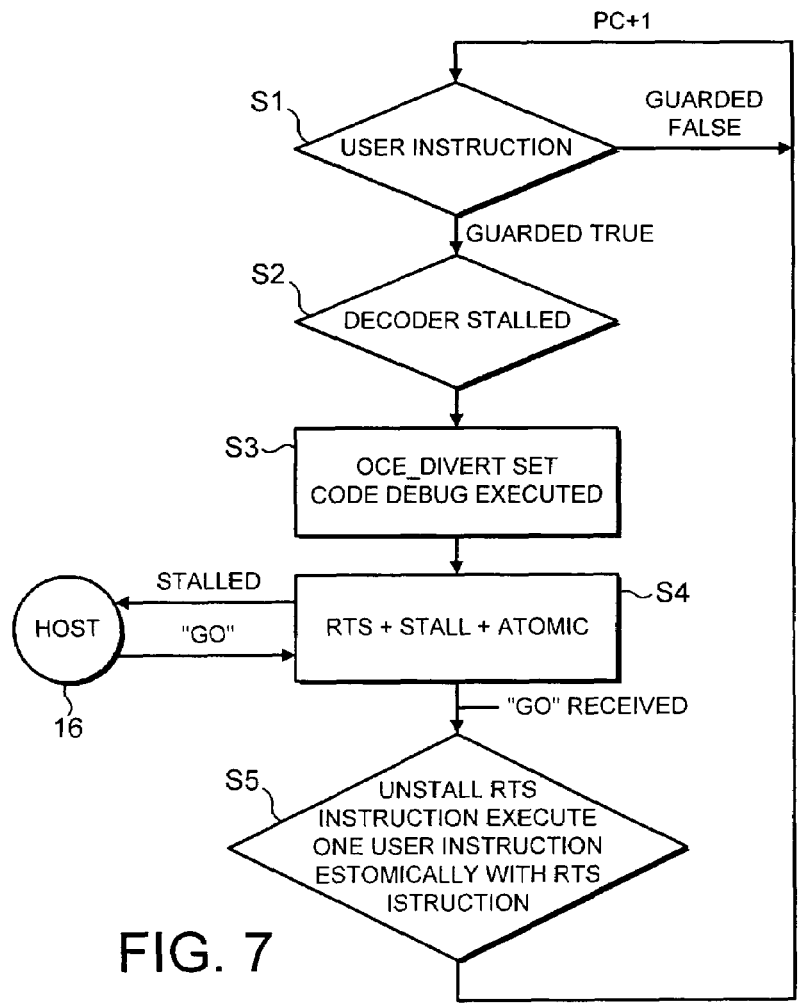
FIG. 7 is a flow chart illustrating the step-by-step mechanism.

The on-chip emulator 6 can use the precise PC watch mechanism to implement step-by-step execution of code. Step-by-step execution of code is a useful debugging mechanism in which a sequence of instructions are executed, one at a time with an "automatic" pause in between to allow debugging functions. Thus, each instruction is executed and the processor then goes into a state where the OCE 6 takes over operation by implementing a divert routine, for example to read the architectural state of the processor prior to execution of the next instruction, to allow communication with the off-chip host. In a processor which implements predicated execution, it is clear that there is only a need to stall on instructions which are committed. In the processor described herein, the step-by-step mode is set by the host 16 by setting a bit in a step-by-step control register 56 in the on-chip emulator 6. That register 56 is connected to the on-chip emulation control block 36 which controls operations of the decode/dispatch stage 24. When the step-by-step control register 56 is set into step-by-step mode, each machine instruction is treated as though it is set as a PC watch. A request for guard resolution is made as described above in relation to the precise watch mechanism and the decoder waits for the guard resolution. Responsive to a commit signal 52, the decoder is stalled and a divert is implemented. If the instruction is not committed, the next instruction is executed. FIG. 7 is a flow chart illustrating the operations for each instruction in step-by-step mode. Step S1 denotes the guard resolution as described above. If the guard is false, the next instruction (PC+1) is executed. If the guard is true, the decoder is stalled (step S2). According to step S3, a divert is set by the on-chip emulator 6 such that debug code from the program memory 50 is executed. The divert is implemented as described above by issuance of the divert signal 46 to the multiplexor 48. The debug code ends with an RTS instruction (i.e. an instruction which returns from the debug routine to the interrupted sequence) called with stall and atomic attributes as denoted by step S4. The OCE 6 informs the host 16 of the stall state of the processor via the links 12,14. The host can unstall the processor by issuing a go command to the OCE 6 which sets the decoder into a state of "go" to execute the next instruction. Setting the atomic state ensures that no other instructions can be executed prior to execution of the next instruction in the step-by-step sequence. There is however provision for execution of high level interrupts as described later and indicated by step S5 in FIG. 7.

Figure 8:
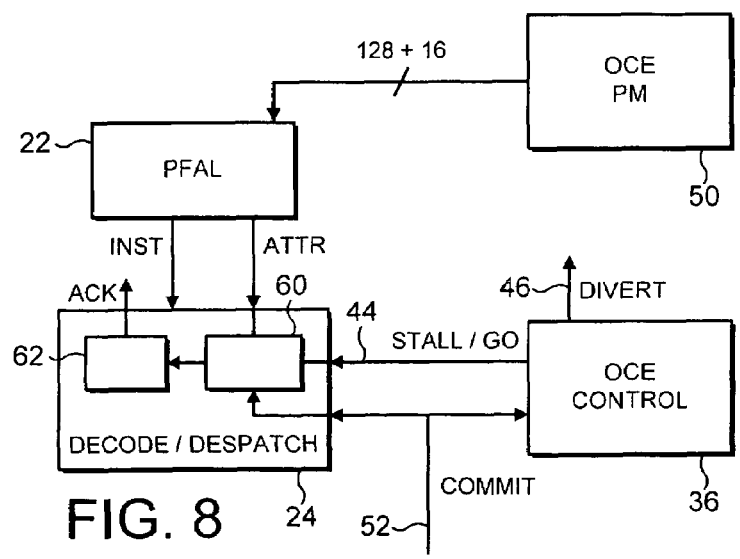
FIG. 8 is a schematic diagram illustrating stalling at the decode/dispatch stage.

As described above, the decode stage can be set into a stall state either by reading a stall attribute from a debug instruction fetched from the on-chip emulation program memory 50 or by receiving a stall command on line 44 from the on-chip emulation control block 36 responsive to a precise PC watch or step-by-step control mode. FIG. 8 illustrates this. The decode/dispatch stage 24 includes a state machine 60 which handles each stall inducing state. Thus, the state machine 60 is responsible for decoding attributes from the OCE program memory 50, for detecting a stall command from the OCE control block 36 and for detecting receipt of the commit signal 52. An acknowledgement generator 62 issues acknowledgement signals ACK responsive to the state machine 60. In a stall state, the decode/dispatch unit does not acknowledge subsequent instructions.

When in a stall state, certain interrupts can be taken. This is particularly important when the decode stage 24 is stalled awaiting a go command to be issued from the host 16, because this could take some time. Interrupts are each issued with particular priority levels. Divert routines for the on-chip emulator also have their own priority levels. Normally, the on-chip emulator divert routines would have a high priority level ensuring that they were executed in place of normal code. However, some interrupts are so important, particularly for real time systems, that they have a priority level higher than the divert routines of the on-chip emulator 6. Such interrupt routines will be executed when the processor is in a stall state. An interrupt instruction can be taken while the decode/dispatch stage 24 is waiting to receive the Commit signal 52. In that case, the Commit signal which has been received will be ignored and, when returning from the interrupt routine, the prefetch/align stage 22 will present again the PC watch instruction, breakpoint or step-by-step instruction to the decode/dispatch stage, and a new request will be sent to the data unit pipelines for guard resolution.

The interrupt handler code itself may contain a PC watch or break point.

Figure 9:
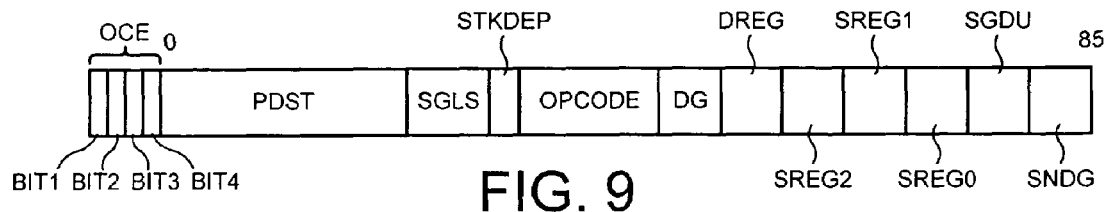
FIG. 9 illustrates a microinstruction format.

It will now be described how guard resolutions are dealt with. FIG. 9 illustrates the format of a microinstruction accepted by the data unit execution pipelines $DU_0, DU_1$. The microinstruction format has a number of different fields which are occupied depending on the nature of the machine instruction which caused the microinstruction to be generated.

The SNDG field is used to implement a sendguard instruction to allow guard values to be sent between the data unit pipelines and the address unit pipelines.

The SGDU field indicates that a data unit operation has been guarded and denotes the guard.

There are three source register fields $SREG_0, SREG_1$ and $SREG_2$ and a destination register field DREG.

The DG field indicates that a guard value has been modified and is used to synchronise guard values between the address unit pipelines and the data unit pipelines.

An opcode field denotes the operations to be effected by the instruction.

The SGLS field indicates that the load/store part of the instruction is guarded and denotes the guard.

The LDST field indicates that the instruction implements a store or load in and out of load and store data queues. These are not illustrated in the drawings or described further herein because they are not pertinent to the present invention. In brief, they allow data to be queued for accesses to and from main data memory.

The microinstruction format also includes four OCE bits. Bit 1 indicates that the load/store sendguard guard should be inverted before being transmitted to the on-chip emulator 6. This is to take into account instructions which are guarded on a false guard. Normally, instructions are committed if a guard value is read as true. Falsely guarded instructions are committed if the guard value is read as false. Bit 2 indicates that the value of the guard (i.e. to denote commit or non-commit) read in the SGLS field should be sent to the on-chip emulator 6 and the decode/dispatch stage 24.

Bit 3 indicates that the value of the guard (i.e. to denote commit or non-commit) read in the SGDU field should be sent to the on-chip emulator 6 and decode/dispatch stage 24.

Bit 4 indicates that a store is for the on-chip emulator 6.

Figure 10:
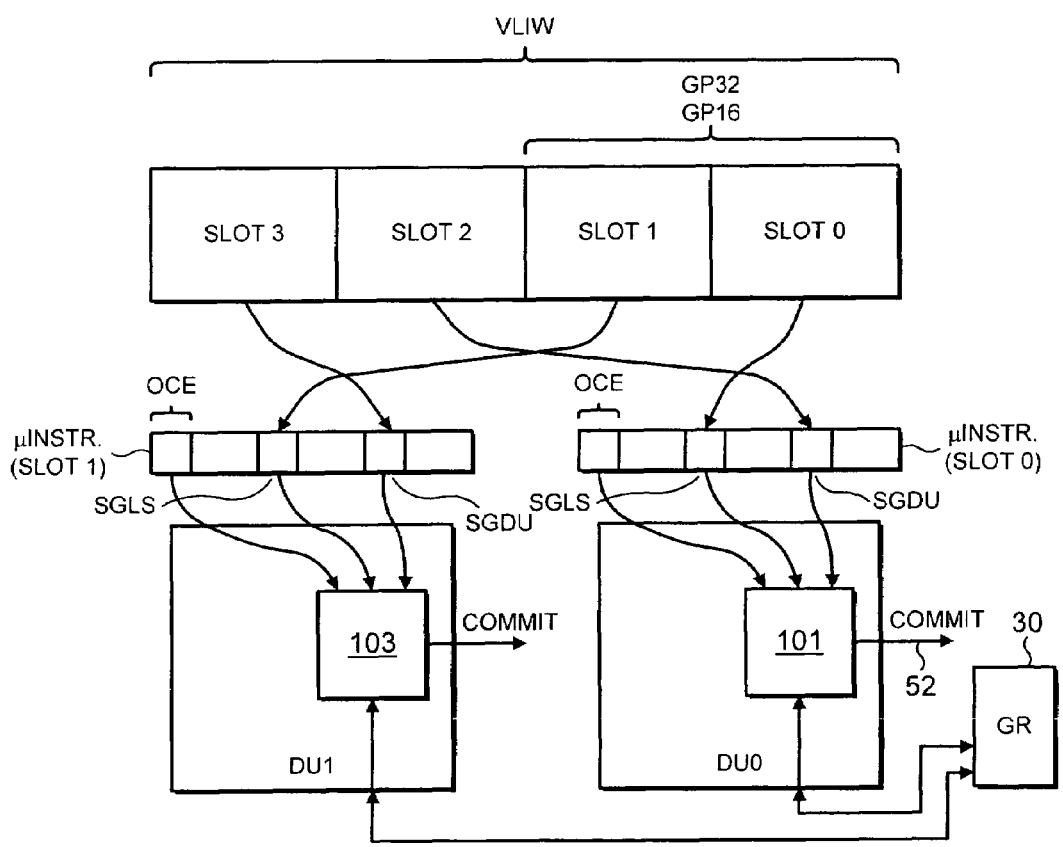
FIG. 10 is a sketch illustrating the architectural aspects of guard resolution.

Thus, it can be seen that there are two fields in the microinstruction which allow guard value resolutions to be carried out, the SGLS and SGDU fields. As two microinstructions can be received by the data unit pipelines $DU_0, DU_1$ simultaneously, it is possible to convey four guards to be resolved to the data unit pipelines in these two microinstructions. This is useful because it allows all of the possible guards in a VLIW word to be transmitted to the data unit pipelines in the same cycle and thus for the guard values to be resolved without undue delay. This is dealt with in the manner shown in FIG. 10. The data unit execution pipelines $DU_0, DU_1$ contain circuitry for reading the SGDU and SGLS fields in conjunction with the relevant OCE bits to access the guard register file 30 and generate the Commit signal 52 accordingly. The execution pipelines $DU_0, DU_1$ deal with the fields in a predetermined order, i.e. $DU_0$sgIs; $DU_1$sgIs; $DU_0$sgdu; $DU_1$sgdu to allow synchronisation of the commit signals with respective PCs.

It will be appreciated that at any one time the on-chip emulator 6 may hold a number of PCs indicating PC watch instructions which are waiting for respective Commit signals to be returned from the data unit pipelines. This is dealt with in the on-chip emulator by a synchronisation mechanism which includes incoming PCs and Commit values. This allows the Commit signals to be associated with the correct PCs. This is discussed in more detail in our co-pending Application No. (Page White & Farrer ref. 92332).

Figure 11:
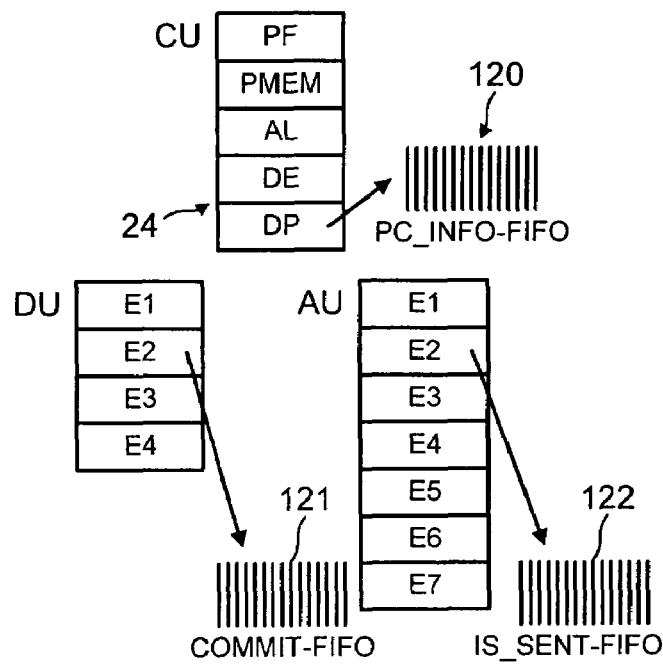
FIG. 11 illustrates schematically FIFOs in the synchronisation unit.

For the sake of completeness, the mechanism used in the synchronisation unit 38 will be briefly explained with reference to FIG. 11. Instructions are output by the dispatch stage 24 which supplies to a program count FIFO (first in first out buffer) 120 an indication of the program count and an indication if the instruction is a load or store instruction. As the instruction passes through the pipeline stages of the data unit DU the guard value is resolved by hardware 101,103 provided in the data unit for the normal execution of instructions in the data unit and is not additional hardware for use solely by the debugging operation. In this example the resolution is shown as occurring at stage e2 in the pipeline and the commit signal indicating whether the guard value is resolved as true or false is supplied to a commit FIFO 121. When a load/store instruction is executed in the pipeline within the address unit AU a signal is sent to a load store sent FIFO 122 to indicate whether or not the load/store has been dispatched by the address unit to a data memory controller (not shown). FIFO 120 receives its signals on line 42 of FIG. 2. FIFO 121 receives its signals on line 52 of FIG. 2.

Figure 12:
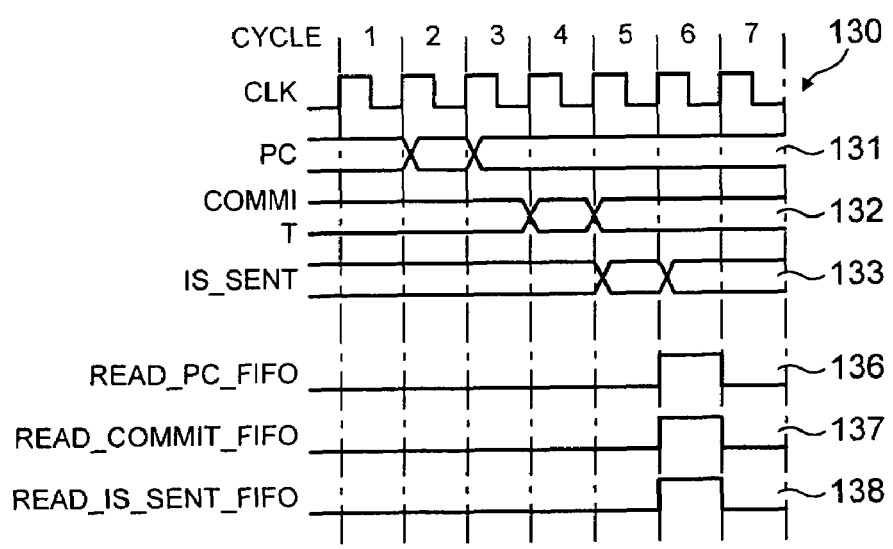
FIG. 12 illustrates a timing diagram for operation of the synchronisation unit.

The timing of the synchronisation system 104 will be explained with reference to FIG. 12. The cycles of operation of instruction fetches, execution pipelines and memory accesses are controlled by clock cycles with a clock signal as shown at 230 in FIG. 7. The figure illustrates four successive clock cycles and in this example the program count of the instruction dispatch by dispatch stage 24 occurs in cycle 2 as shown in the program count line 131. The commit signal is sent out in cycle 4 as shown in line 132. The load/store signal from the address unit is provided in cycle 5 as shown in line 133. It will be appreciated that the signal on line 131 was fed into FIFO 120. The signal on line 132 was fed into FIFO 121. The signal on line 133 was fed into FIFO 122. Each of the FIFOs 120,121 and 122 operate on synchronised clock cycles from the clock signal shown in FIG. 12. Each of the FIFOs 120-122 is then read in clock cycle 6 as shown by lines 136,137 and 138 in FIG. 12. The result of reading each of those FIFOs on the same clock cycle 9 will indicate correlation between a commit signals and any of the events watched on lines 131-133. The emulator can therefore through use of the synchronisation unit 38 establish the program count which was associated with a committed instruction and one which gave rise to a PC watch.

What is claimed is:

1. A computer system on a single chip for executing predicated instructions wherein each instruction includes a guard, the value of which determines whether or not that instruction is executed, the computer system comprising:
   a fetch unit for fetching instructions to be executed;
   a decode unit for decoding said instructions;
   at least one pipelined execution unit for executing decoded instructions and being associated with a guard register file holding values of the guards to allow resolution of the guards to be made to determine whether an instruction is committed; and
   an emulation unit including control circuitry which cooperates with the decode unit to selectively control the decode unit to implement step-by-step execution of an instruction sequence wherein, for each committed instruction, a divert debug routine is executed by the computer system and for each non-committed instruction the next instruction in the instruction sequence is executed;
   wherein, for each instruction in the sequence, the decode unit is operable to issue a request to the execution pipeline for guard resolution, the guard resolution being transmitted to the control circuitry of the emulation unit which implements said divert debug routine if the instruction is committed.

2. A computer system according to claim 1, which includes a program memory for holding said instructions to be executed.

3. A computer system according to claim 1, wherein the emulation unit is associated with an emulation program memory which holds a plurality of divert routines.

4. A computer system according to claim 1, wherein the divert routine comprises a sequence of debug instructions, each debug instruction being associated with at least one debug attribute.

5. A computer system according to claim 4, wherein the last instruction in the divert routine includes a stall attribute which places the decode unit in a stall state.

6. A computer system according to claim 4, wherein the last instruction in the divert routine includes an atomic attribute which inhibits execution of any instruction other than the next instruction in the step-by-step sequence.

7. A computer system according to claim 4, wherein the last instruction in the divert routine restores the interrupted instruction sequence.

8. A computer system according to claim 1, which is connected to a host computer which can take over operation of the emulation unit responsive to certain debug conditions.

9. A computer system according to claim 1, which includes a microinstruction generator which receives instructions from the decode unit and supplies microinstructions to the execution pipeline, said microinstructions including fields for holding respective guards to be resolved.

10. A computer system according to claim 1, which includes a plurality of parallel pipelined execution units, including at least two data unit pipelines for executing data processing instructions and at least two address unit pipelines for executing memory access instructions.

* * * * *